United States Patent
Grant et al.

(10) Patent No.: US 6,611,368 B1
(45) Date of Patent: Aug. 26, 2003

(54) TIME-DIVISION MULTIPLEXED PUMP WAVELENGTHS RESULTING IN ULTRA BROAD BAND, FLAT, BACKWARD PUMPED RAMAN GAIN

(75) Inventors: Andrew R Grant, Matawan, NJ (US); Pavel Viktorovich Mamyshev, Morganville, NJ (US); Linn Frederick Mollenauer, Colts Neck, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/552,772

(22) Filed: Apr. 20, 2000

(51) Int. Cl.[7] .................. H01S 3/30; H04B 10/12; H04J 4/00
(52) U.S. Cl. .................. 359/334; 359/341.3; 359/123
(58) Field of Search ................. 359/334, 341.3, 359/123; 372/3, 38.06, 70

(56) References Cited

U.S. PATENT DOCUMENTS

| | | | | |
|---|---|---|---|---|
| H499 H | * | 7/1988 | Lin ..................... | 359/333 |
| 5,883,736 A | | 3/1999 | Oshima et al. .......... | 359/341 |
| 6,191,877 B1 | * | 2/2001 | Chraplyvy et al. ....... | 359/124 |
| 6,262,823 B1 | * | 7/2001 | Nowatzyk .............. | 359/140 |
| 6,388,781 B1 | * | 5/2002 | Saunders .............. | 359/123 |
| 6,417,959 B1 | * | 7/2002 | Bolshtyansky et al. .... | 359/334 |
| 6,452,716 B1 | * | 9/2002 | Park et al. ............ | 359/334 |
| 6,480,326 B2 | * | 11/2002 | Papernyi et al. ........ | 359/334 |
| 6,504,645 B1 | * | 1/2003 | Lenz et al. ............ | 359/334 |

FOREIGN PATENT DOCUMENTS

| | | | | |
|---|---|---|---|---|
| DE | 195 16 262 A | | 10/1996 | ............ H04J/14/08 |
| EP | 0 286 338 A1 | * | 3/1988 | |
| EP | 0 843 435 A | | 5/1998 | ............ H04J/14/08 |
| EP | 1 148 666 A2 | * | 10/2001 | |
| JP | 09-061861 | * | 3/1997 | |
| JP | 2002-6349 | * | 1/2002 | |
| WO | WO 00 05622 A | | 2/2000 | ............ G02F/1/35 |

OTHER PUBLICATIONS

H. Masuda et al. "1.65–um Band Fibre Raman Amplifier Pumped by Wavelength–Tunable Broad–Linewidth Light Source." ECO '98, Sep. 1998, pp. 139–141.*
H. Masuda et al. "1.65–um Band Fibre Raman Amplifier Pumped by Wavelength–Tunable Broad–Linewidth Light Source." Elec Lett. Nov. 26, 1998, 34:24, pp. 2339–2340.*
A. Hasegawa, "Numerical Study of Optical Soliton Transmission Amplified Periodically By the Stimulated Raman Process", *Applied Optics*, vol. 23, (1984), pp 3302–3309.
L. F. Mollenauer et al, "Soliton Propagation in Long Fiber With Periodically Compensated Loss", *IEEE Journal Quantum Electronics*, vol. QE–22 (1986), pp 157–173.
L. F. Mollenauer et al, "Demonstration of Soliton Transmission Over More than 4000 km in Fiber With Loss Periodically Compensated by Raman Gain", *Optics Letters*, vol. 13 (1988), pp 675–677.
I. Kim et al, "Broadly Tunable Vertical Coupler Filtered Tensile–Strained InFaAs/InGaAsP Multiple Quantum Well Laser", *Applied Physics Letters*, vol. 64, (1994) pp 2764–2766.

* cited by examiner

*Primary Examiner*—Thomas G. Black
*Assistant Examiner*—Andrew R Sommer
(74) *Attorney, Agent, or Firm*—Barry H. Freedman

(57) ABSTRACT

A method and apparatus for producing a flat gain over very broad gain bands utilizing backward-pumped Raman amplification. The method allows for dynamic gain control through simple electronic means.

29 Claims, 7 Drawing Sheets

TIME-DIVISION MULTIPLEXED PUMP WAVELENGTHS RESULTING IN ULTRA BROAD BAND, FLAT, BACKWARD PUMPED RAMAN GAIN

FIELD OF THE INVENTION

This invention relates generally to the field of optical communications and in particular to a method and apparatus for producing a flat Raman gain over very long bands.

BACKGROUND OF THE INVENTION

Early proposals for all-optical transmission (see, e.g., A. Hasegawa, "Numerical study of optical soliton transmission amplified periodically by the stimulated Raman process," Appl. Opt., 23,1095 (1984); L. F. Mollenauer, J. P. Gordon, and M. N. Islam, "Soliton propagation in long fibers with periodically compensated loss," IEEE J. Quantum Electronics QE-22, 157 (1986)) were based on the use of gain from the Raman effect to turn spans of transmission fiber into their own amplifiers. The scheme afforded many fundamental advantages, and indeed, it was used successfully for the first demonstration of an all-optical, long-distance transmission and subsequently reported by L. F. Mollenauer and K. Smith, in an article entitled "Demonstration of soliton transmission over more than 4000 km in fiber with loss periodically compensated by Raman gain," which appeared in Opt. Lett. 13, 675 (1988).

Nevertheless, with the advent of the erbium fiber amplifier in the late 1980's, Raman amplification temporarily fell out of vogue, largely due to the pump powers required. That is, within the context of single-channel transmission, where the signal powers are rarely more than one or two milliwatts, the several hundreds of milliwatts threshold power required for net positive Raman gain seemed excessive and, at the time, impractical. With the recent ascendance of dense WDM (where net signal levels can easily reach one hundred mW or more), and with the simultaneous commercial availability of several-hundred mW output semiconductor pump lasers, however, opinion has changed. Now Raman gain is highly prized for its ability to overcome noise/non-linear penalties, and for the fact that the position and extent of the gain band depend only on the available pump wavelengths. Another extremely important advantage of Raman amplification for dense WDM lies in the fact that, in stark contrast to erbium amplifiers, the shape of the Raman gain band is essentially independent of pump and signal levels.

As a result of its importance to optical transmission systems, methods and apparatus which facilitate the production and utilization of Raman gain are desired and a continuous avenue for exploration.

SUMMARY OF THE INVENTION

We have developed a method and apparatus for producing a flat gain over very broad gain bands utilizing backward-pumped Raman amplification. The method allows for dynamic gain control through simple electronic means.

The method involves the time division multiplexing of combined pump wavelengths to attain broad Raman gain bands. Originally conceived as a way to prevent the various pump wavelengths from interacting with each other, our method has proven to have several other very great and important advantages, especially in a preferred, frequency-swept embodiment.

Specifically, our frequency-swept method produces extremely flat gain (variation less than 0.05%) across gain bands at least 8 THz wide while allowing for a wide variation of adjustment in the shape of the gain band, as might be required to overcome various system defects. Advantageously, all of these conditions may be established and altered within microseconds, utilizing known, simple, all-electronic control.

DETAILED DESCRIPTION OF THE INVENTION

Figure 1:
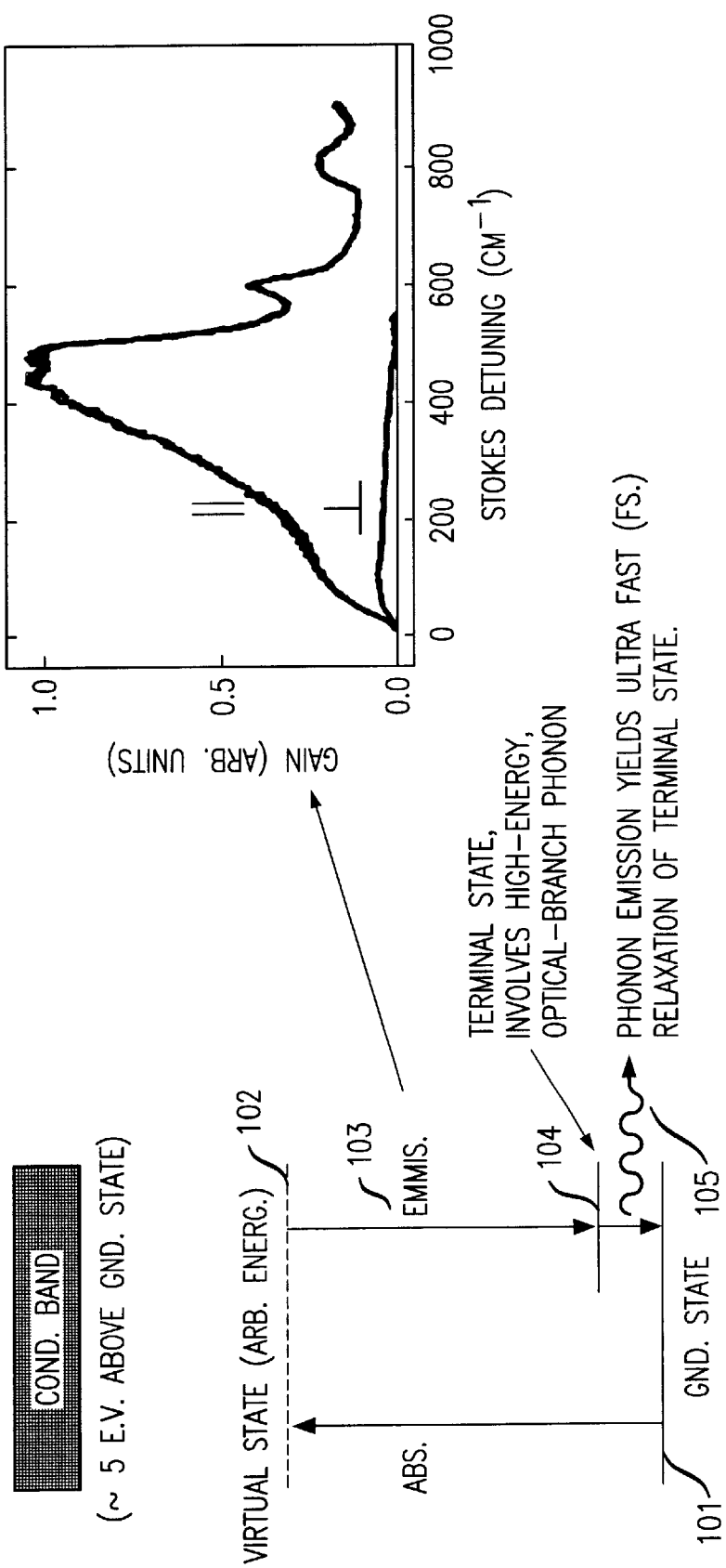
FIG. 1 is a schematic drawing illustrating the Raman effect and a graph depicting the Raman gain.

By way of background and with reference to FIG. 1, there is shown in schematic form a diagram depicting the Raman effect. Briefly, and with reference to that Fig, the Raman effect in silica-glass fibers begins with a pump-induced transition from a ground state 101 to a virtual state 102, followed by an emission 103 from that virtual state 102, where the emission terminates on an excited state 104 of the lattice. Emission of an optical phonon 105 (which typically takes place within a few femtoseconds) then completes return to the ground state 101.

The optical transitions are really highly non-resonant ones to the excited electronic levels, which in silica glass, lie some 5–6 eV above the ground state. Hence, the optical transitions get their strength primarily from the matrix elements of the very strong, allowed transition to the first electronic state.

Because of the extremely fast relaxation, the population of the terminal state of the optical emission tends to be determined by equilibrium with the surrounding phonon bath, and hence is almost independent of the rates of optical pumping and emission. This fact is the source of the independence, cited above, of the shape of the Raman gain band from the optical pumping dynamics.

It is important to note that the Raman response, as just described, is essentially "instantaneous", and hence tends to create a serious problem with dependence of the gain on signal pattern in forward pumping (pump and signal traveling in the same direction). Nevertheless, the long effective path for interaction between pump and signal obtained with backward Raman pumping (approximately equal to twice the characteristic fiber loss length), typically corresponds to effective integration times of several hundreds of microseconds. This is as long or longer than the integration times of erbium amplifiers operated at high pump and signal power levels, and is more than long enough to eliminate the problem of pattern dependence, even with the time-division multiplexing scheme presented here and in accordance with the present invention.

The Raman effect is greatest when the pump and signal are co-polarized, and is nearly zero when they are orthogonally polarized (see insert to FIG. 1. There are essentially two ways in which this polarization dependence is overcome: first, by making the pump itself unpolarized, and second, by using only backward Raman pumping.

In the latter, in response to the usual fiber birefringence, the Stokes vectors representing the (opposite-traveling) pump and signal rotate around the Poincare sphere in opposite directions, thus thoroughly averaging the relative polarization states of pump and signal on a path-average basis. Either method tends to be fairly effective all by itself, but when used together, any measurable polarization dependence of the Raman gain tends to disappear altogether.

The pump and signal photons interact with each other according to the following pair of coupled equations:

$$\frac{dp_s}{p_s} = \left(-\alpha_s + \frac{R}{A_{eff}} P_p\right) dz \quad (1a)$$

$$\frac{dp_p}{p_p} = \left(-\alpha_p + \frac{R}{A_{eff}} P_s\right) dz \quad (1b)$$

where $\alpha_p$ and $P_p$ are the fiber loss coefficient and power, respectively, at the pump wavelength, and $\alpha_s$ and $P_s$ are the corresponding quantities at the signal wavelength, $A_{eff}$ is the fiber effective core area, and R the Raman gain factor. At the peak of the Raman gain band, for copolarized pump and signal in pure silica fiber, $R=68$ km$^{-1}$/W/$(\mu m)^2$, while for an unpolarized pump, it has roughly half that value. Finally, R increases significantly with increasing Ge content of the fiber.

Figure 2:
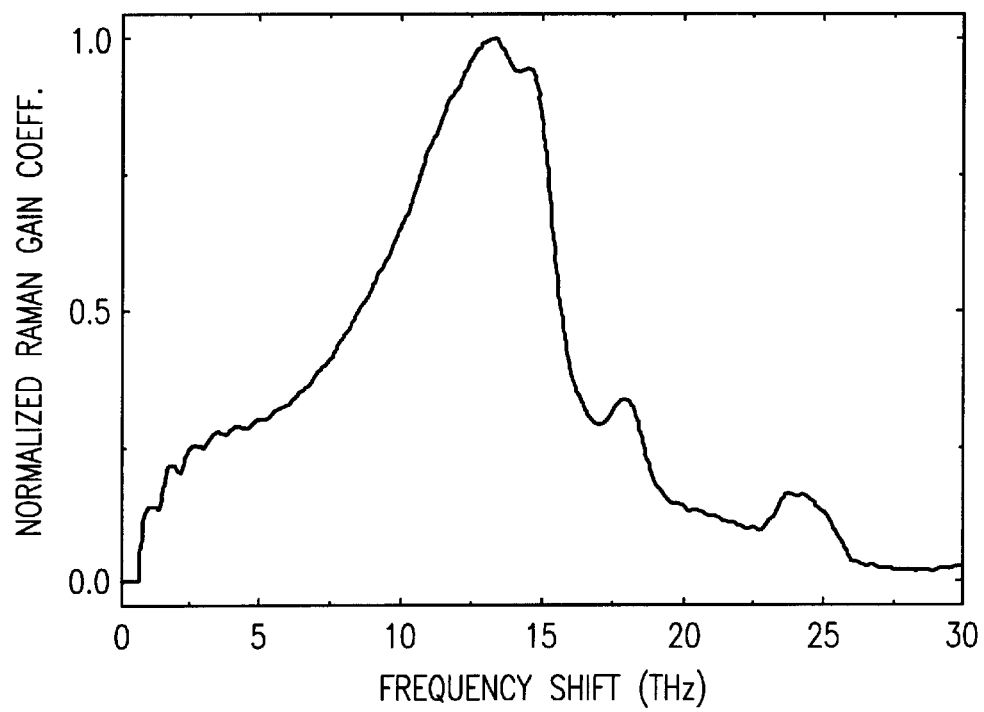
FIG. 2 is a graph showing the Raman gain for dispersion shifted optical fiber.

Although the exact shape of the Raman gain band depends somewhat on the glass composition, nevertheless, the examples shown in FIG. 1, for nearly pure silica glass, and in FIG. 2, for dispersion shifted fiber, are typical, the shape is always highly asymmetrical, with an almost linear slope to zero frequency difference, and with a much steeper descent on the high frequency side of the peak. In the use of multiplexed pump frequencies (or wavelengths) to achieve a broader flat gain band, as we shall illustrate soon, the asymmetry of the Raman response tends to dictate a rather odd, highly non-uniform distribution of relative powers of the various pump wavelengths. The required distribution, however, no matter how complicated, is particularly easy and economical to achieve with the technique to be described here.

We originally conceived an aspect of the present invention as a way to overcome a fundamental problem that otherwise tends to accompany the use of multiple pump wavelengths, viz., the very strong and harmful interaction that can obtain among them via the Raman effect itself. Consider, for the simplest example, the interaction between just two pump wavelengths, which interaction can be computed from the coupled Eqns(1) by treating the longer of the two pump wavelengths as the signal.

Figure 3:
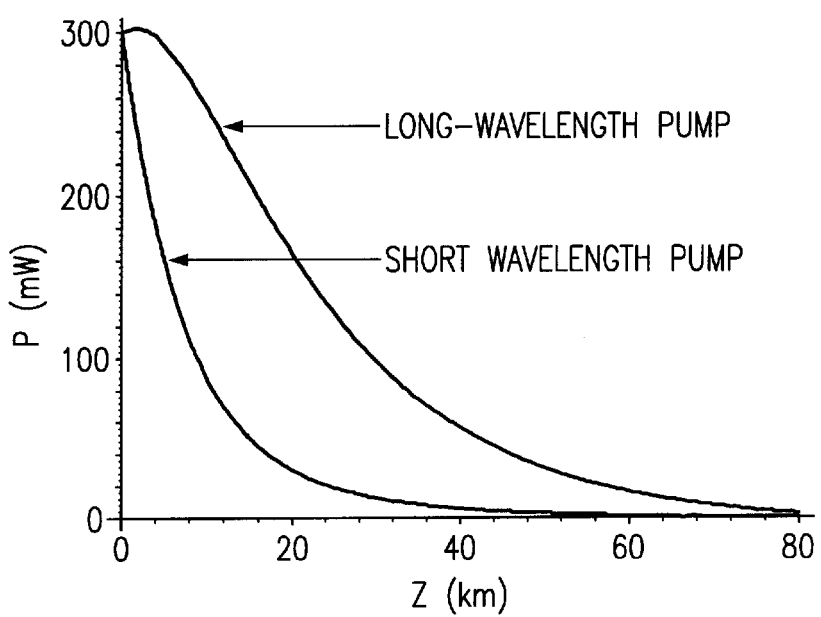
FIG. 3 is a graph showing pump wavelength vs. distance for a Raman pump.

As illustrated in FIG. 3 and with reference now to that FIG., as the pump wavelengths travel down the fiber together, energy is rather quickly transferred from the shorter to the longer wavelength. Therefore, on a path-average basis, the distribution of relative powers between the two pumps is much different from the initial (and presumably intended) one. Furthermore, since it is important that the Raman gain be as uniformly distributed throughout the fiber span as the linear fiber loss will allow, "pre-emphasizing" the shorter wavelength power is not a satisfactory solution either. We note, however, the two pump wavelengths can travel down the fiber at separate times, and thus avoid interaction. As long as the rate at which the power is dithered back and forth between the wavelengths is fast enough relative to the effective integration time, the accumulated signal gain will remain time (and hence pattern) independent. Since, as already noted, the integration time with backward Raman pumping tends to be of order several hundreds of microseconds, the required frequency of dithering need be no greater than about one, or at the very most, a few MHz. For that frequency range, the required electronic drive of the lasers is simple, cheap, and easily constructed.

Figure 4:
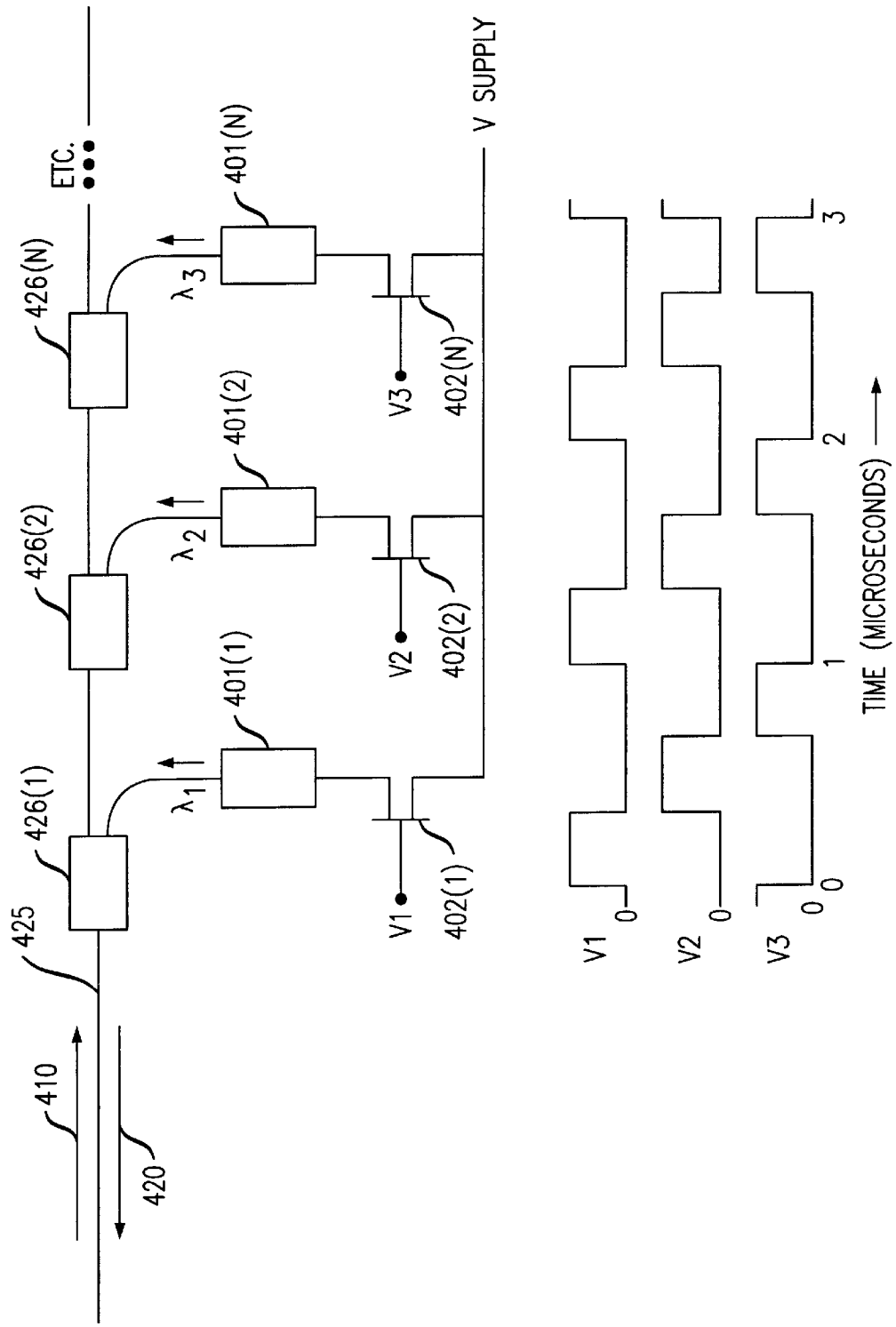
FIG. 4 is a schematic drawing depicting a number of pump wavelengths optically multiplexed together according to the present invention.
Figure 5:
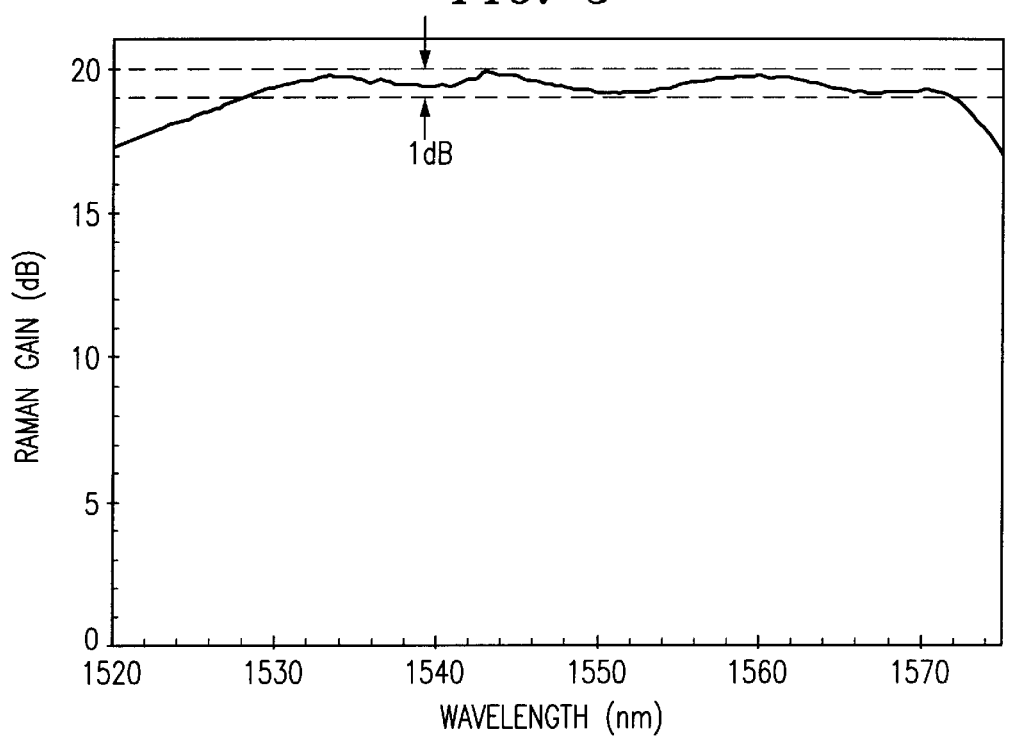
FIG. 5 is a graph showing Raman gain (dB) vs. wavelength.

There are two basic versions of the time-division multiplexing scheme which is the subject of the present invention. In the first, shown schematically in FIG. 4, a number of fixed-wavelength lasers 401(1) . . . 401(N) are optically multiplexed together, but made to operate at separate times through the use of appropriately pulsed drive currents effected by voltage controlled gates 402(1) . . . 402(N), respectively. Although conceptually simple, this version is of limited resolution for the attainment of flat gain (see FIG. 5), and the requirement for multiple lasers and multiplexers is awkward, expensive, and would tend to consume a lot of space. As is depicted in FIG. 4, optical signals 410 traversing optical system 425 includes combined counter propagating Raman pump signal 420 produced by combining the output pumps of lasers 401(1) . . . 401(N) which are coupled into the optical system 425 by couplers 426(1) . . . 426(N), respectively.

Figure 6:
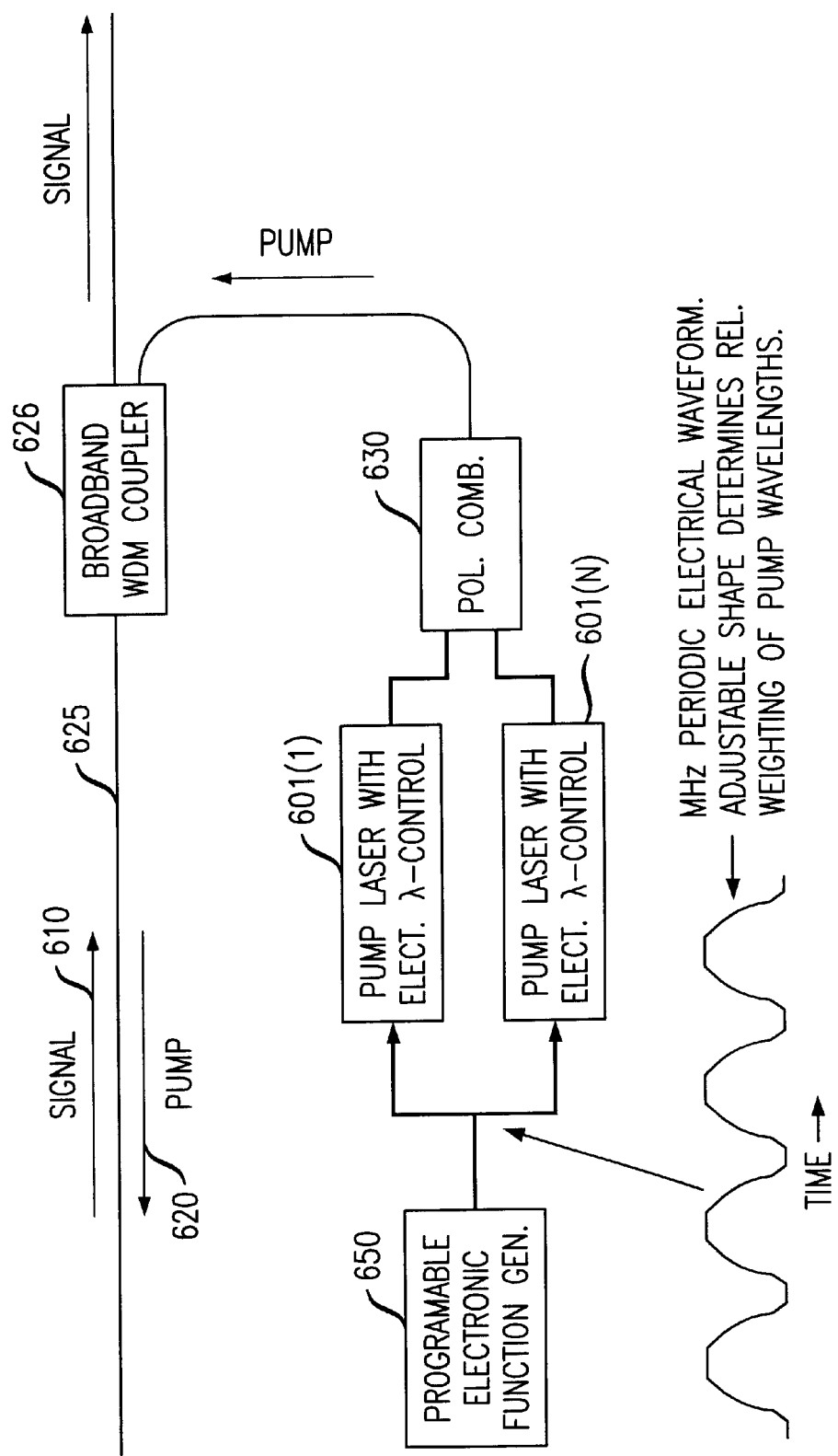
FIG. 6 is a schematic drawing illustrating an alternative arrangement of the present invention.

With reference now to FIG. 6, there is shown an alternative embodiment of the present invention. Specifically, optical signals 610 traversing optical system 625 include counter propagating Raman pump signal 620 coupled into the optical system 625 by coupler 626. Raman pump signal 620 is advantageously generated by a single laser 601(1) or, alternatively two 601(N) the output of which are polarization multiplexed together by polarization combiner 630. Furthermore, and in accordance with an aspect of the present invention, the pump laser(s) are effected with steady (d.c.) current drive, but whose wavelength is continuously and periodically scanned through the action and effect of programmable electronic function generator 650. Advantageously, the programmable function produced by the programmable electronic function generator may be varied in a desired manner to obtain the desired flat gain band. This version (which for convenience, we shall henceforth refer to as the "swept-wavelength" or "swept-frequency" scheme), has the two great advantages of simplicity (and hence economy) on the one hand, and of resolution limited only by the bandwidth of the wavelength-scanning drive electronics on the other. Since that bandwidth could easily be in the range of many tens, or even hundreds of MHz, while still accomplished with inexpensive electronics, the resolution could always be much better than with the first version. It should also be noted that the rapid frequency scanning would tend to obviate the need for other forms of frequency broadening of the laser to avoid Brillouin back scattering of the pump.

Finally, it should be noted that for either scheme, both the extent and the shape of the Raman gain band can be easily and very quickly controlled through simple adjustment of the pertinent electronic waveforms. This simplicity, low cost and speed of gain shape adjustment should be compared with the high cost, complexity, lower speed, and optical insertion loss associated with purely optical gain equalizers.

For our swept-frequency method, we have developed an efficient algorithm to determine that weighting function for a given band of Raman pump frequencies that will yield the flattest and widest possible gain band. The algorithm uses the experimentally measured gain spectrum for a single pump frequency (such as that shown in FIG. 2). It begins with assumption of the desired flat portion of the desired gain spectrum and an educated guess as to the corresponding skirts; the corresponding weighting function is then found by Fourier transformation of the defining equation. This solution is then improved through iteration, where the calculated pump weighting is used to predict better values for the Raman gain spectrum. Although as many as 50 to 100 iterations are often required, the entire process usually takes less than one minute on a fast PC.

Figure 7:
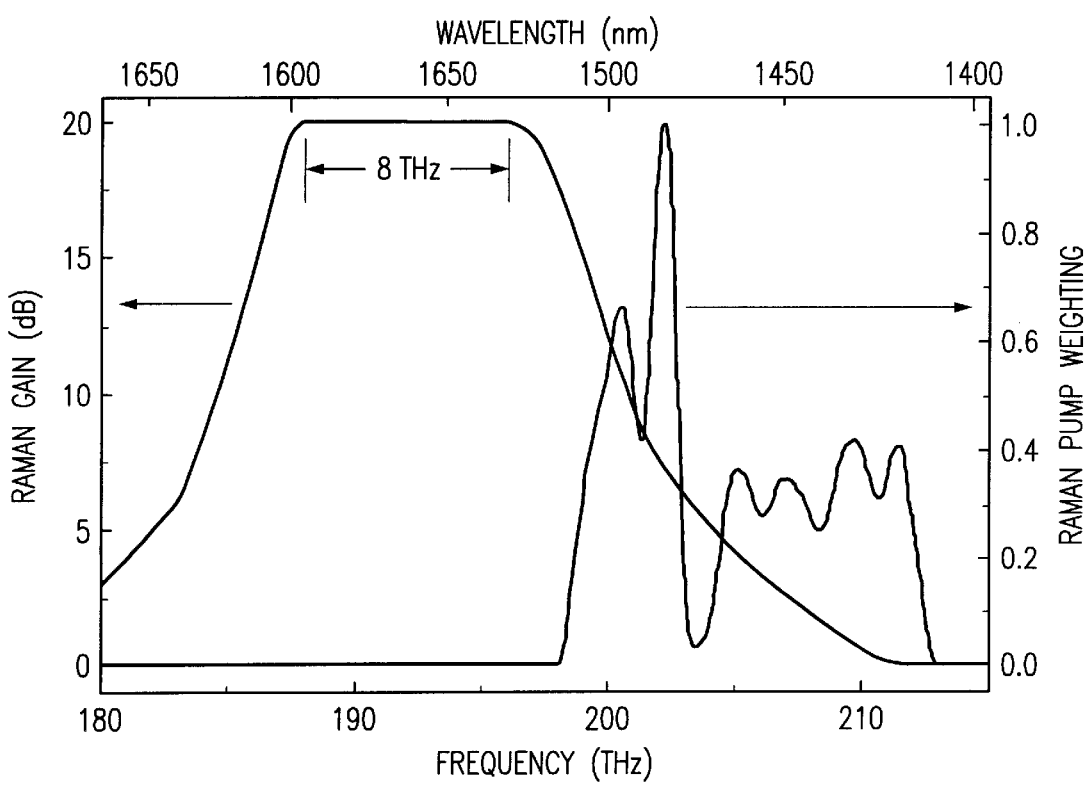
FIG. 7 is a graph showing the >8 THz wide flat gain band (from about 1530 to 1595 nm)
Figure 8:
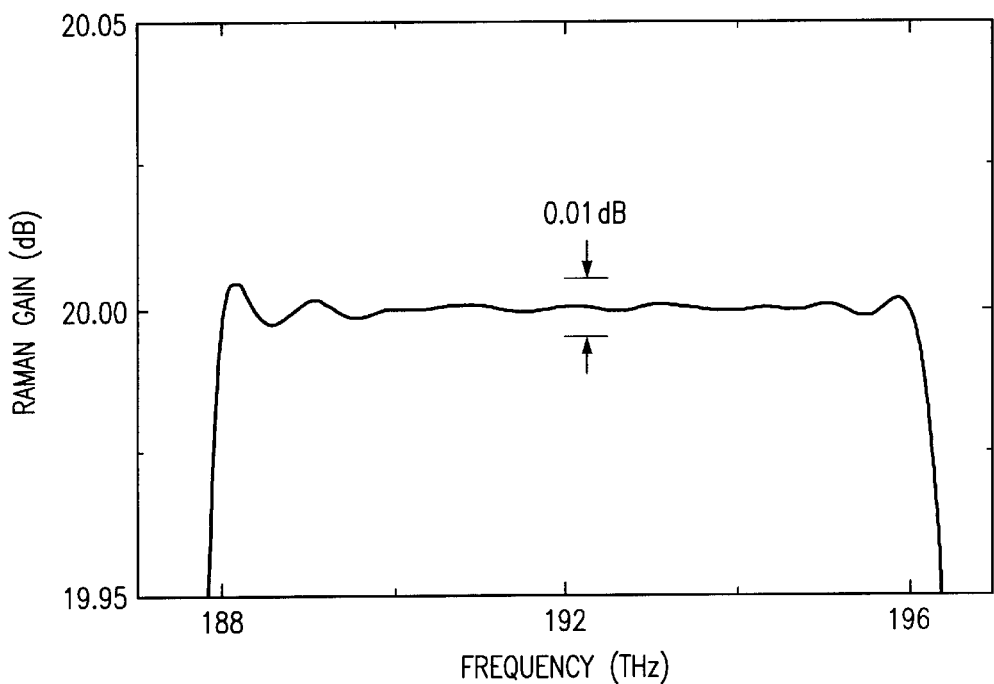
FIG. 8 is a graph showing an expanded view of the flat gain region of FIG. 7.

With simultaneous reference now to FIGS. 7 and 8, there is shown but one example of the sort of results that can be obtained using that algorithm. More specifically, FIG. 7 shows the >8 THz wide flat gain band (from about 1530 to 1595 nm), along with the required weighting function for the pump wavelengths, as they are swept between the limits of about 1515 to 1410 nm. (Note that this gain band is essentially as wide as the combined "C" and "L" bands of the much more complex and cumbersome erbium fiber amplifiers. Note further that the band represents enough space for 3.2 Tbit/s of transmission capacity at a spectral efficiency of 0.4.)

FIG. 8 is an expanded view of the flat gain region, and shows that the gain ripple can be held to less than 0.01 dB (again, out of a nominal 20 dB), or to less than 0.05% variation across the band. We have also determined that reduction in the pump sweep from the 105 nm (15 THz) range cited above to 84 nm (12 THz), the gain ripple is still quite small (<0.02 dB) across the 8 THz band; this may be important for realization with a practical laser.

Figure 9:
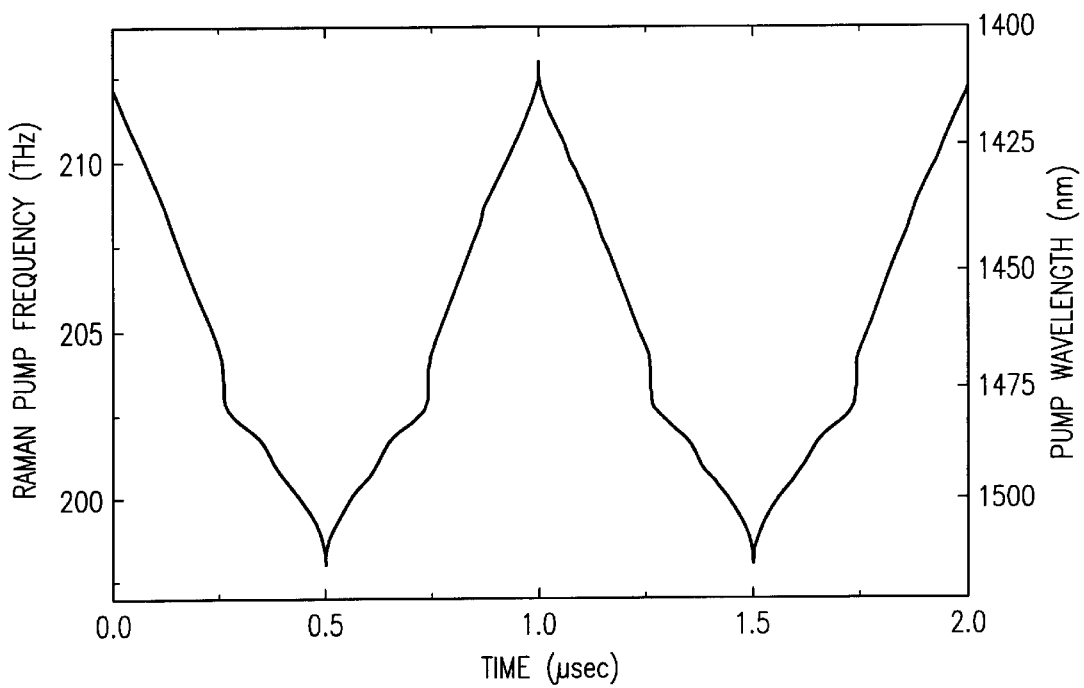
FIG. 9 is a graph showing a periodic variation in the pump frequencies suitable to yield the weighting function shown in FIG. 7.

FIG. 9 shows the required periodic variation in the pump frequencies to yield the weighting function shown in FIG. 7. Under the assumption that the pump laser's output frequency will be more or less linearly related to the voltage or current used to tune it, the drive electronics need have a bandwidth no greater than about 100 times the fundamental drive frequency to reproduce the results of FIGS. 7 and 8 accurately. Thus, in this example, where the assumed fundamental drive frequency is 1 MHz, the electronic bandwidth need be no more than about 100 MHz, a requirement that is very easily met.

Figure 10:
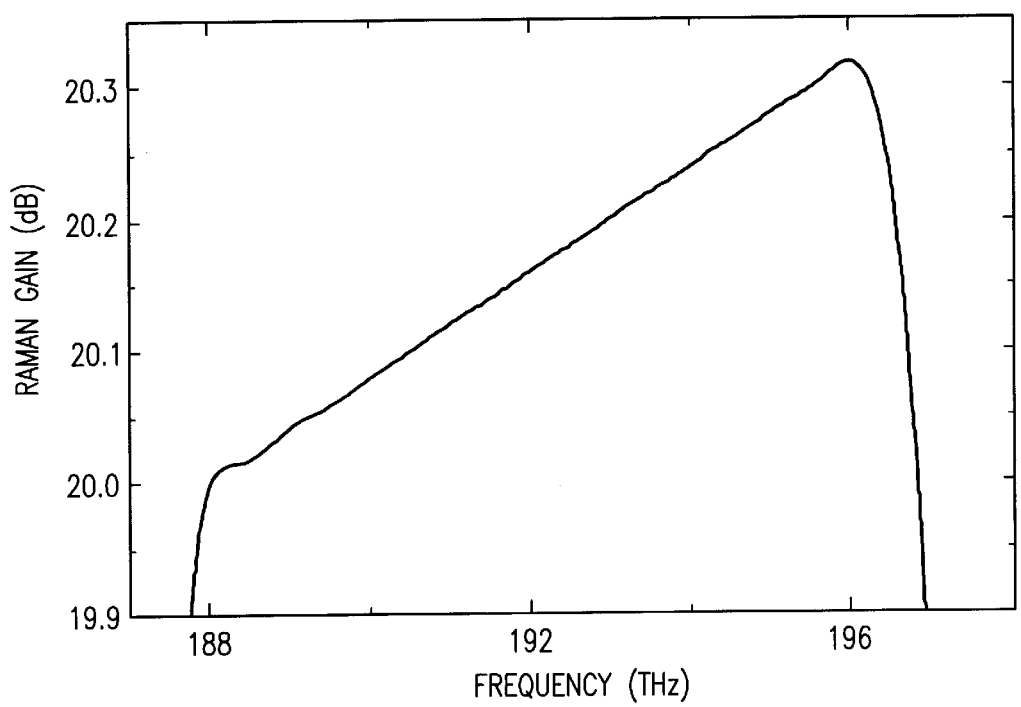
FIG. 10 is a graph showing an exemplary swept frequency gain spectrum according to the present invention.

It should also be understood that the shape of the gain band is not restricted to the dead flat curve of FIG. 8. The swept-frequency method allows for other simple shapes as well, such as the linear slope shown in FIG. 10, which might be needed to compensate for the Raman interaction among the various channels in dense WDM. (The longer wavelength channels experience gain from interaction with the shorter wavelength channels.) In principle, just about any shape of gain band is possible, as long as it can be represented by a smooth and not too rapidly varying function.

Figure 11:
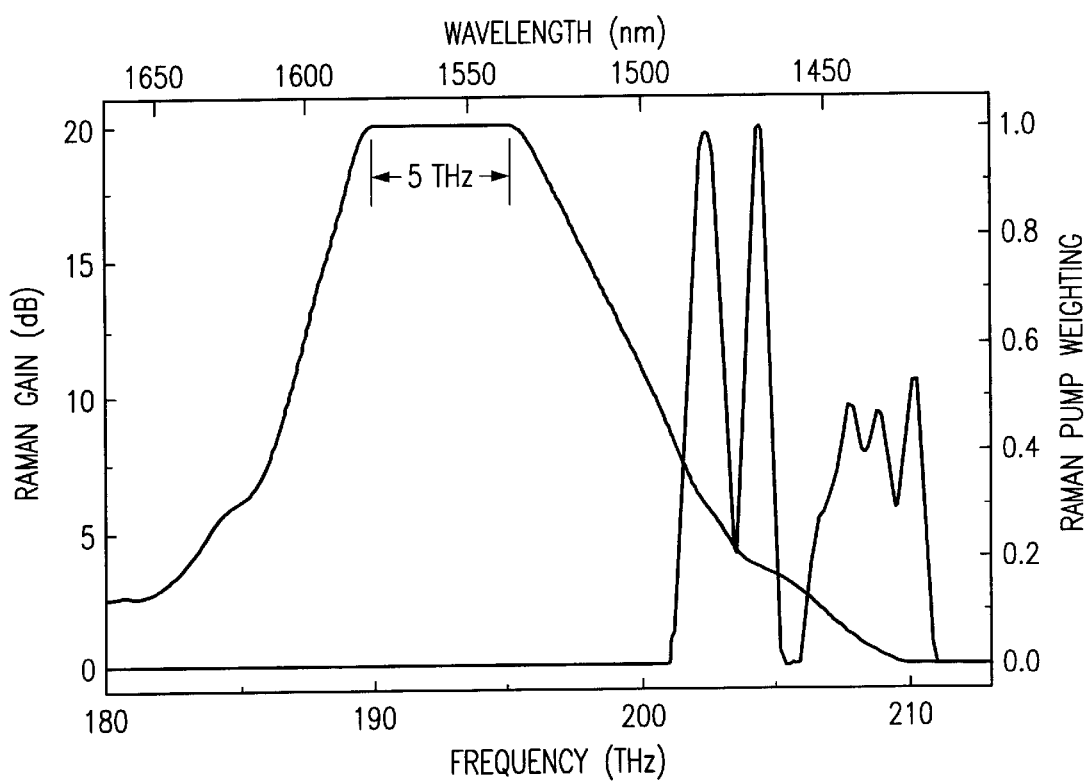
FIG. 11 is a graph showing Raman gain vs. Frequency for a reduced gain bandwidth according to the present invention.

Use of the swept-frequency technique significantly increases the required laser power over that required for narrow-band gain with a fixed frequency pump. In the case of FIG. 7, for example, that factor is 1.87. To give a feeling for the absolute pump powers required, consider an 80 km span of dispersion shifted fiber (with effective core area of about 50 $\mu m^2$, where about 75%, or 12.5 dB of its 16.8 dB span loss is to be compensated by backward-pumped Raman gain. (To compensate more than that fraction can cause problems from Rayleigh double-back scattering of the signals themselves.) In that case, and with negligible levels of signal power, 285 mW of pump power is required for the narrow-band gain, but to produce the 8 THz flat gain band cited here, that power rises to 533 mW. When significant signal powers are involved (as is the case in dense WDM), the pump power must be increased further by an amount somewhat greater than the total signal power itself We also note that for some applications, where the full 8 THz bandwidth of the previous example may not be required, a reduced gain bandwidth allows for a corresponding reduction in the required frequency sweep and power output of the pump laser. FIG. 11 shows an example of this reduction, to a 5 THz gain bandwidth which requires only a 10 THz frequency sweep of the pump lasers, and a laser power factor of only 1.56.

Perhaps the best way to meet the combined requirements for high output power (typically 0.5 W or greater coupled into fiber) and for fast, wide (80 nm or more) frequency tuning of the pump laser, is to use the combination of a widely tunable, lower-power (semiconductor) laser of proven design, followed by a (semiconductor) traveling wave amplifier. An excellent candidate for the tunable laser is the "tunable vertical-coupler filtered laser" or VCFL, as described by I. Kim et al., in an article entitled "Broadly tunable vertical-coupler filtered tensile-strained InFaAs/InGaAsP multiple quantum well laser," which appeared in Appl. Phys. Lett., Vol 64, pp. 2764 (1994). The tuning of this device is based on the fact that a relatively small change in index of the semiconductor (produced by a control current) can easily vary the phase matching wavelength of a long period grating over a large range, viz., 80 nm or more. The long period grating is used to couple the back facet of the laser to a broad-band mirror, so that significant feedback takes place only at the phase matching wavelength. Another possibility might be to use a piece of $LiNbO_3$ or other suitable electro-optic crystal to make a broadly tunable Lyot filter to be inserted into the feedback loop of the laser.

Various additional modifications of this invention will occur to those skilled in the art. Nevertheless, all deviations from the specific teachings of this specification that basically rely upon the principles and their equivalents through which the art has been advanced are properly considered within the scope of the invention as described and claimed.

For example, should it prove difficult to realize a pump laser which can maintain high power output while its frequency is swept over a very wide band (say, 80 nm or more), the problem could be relieved by combining the techniques of FIGS. 4 and 6. In particular, notice from FIGS. 7 and 11 that the pump weighting distributions tend to divide into two fairly well separated bands, viz., a narrower, higher density band covering the lower frequency range, and a broader, lower density band covering the higher pump frequencies. Thus, a pair of swept frequency lasers, each designed specifically for one or the other of these two more restricted frequency ranges, and multiplexed together with a WDM coupler having a sharp transition in the region of the frequency gap, could alternate appropriately in time to provide the equivalent of the overall swept frequency distribution.

What is claimed is:

1. A method of pumping an optical system including a plurality of Raman pumps CHARACTERIZED BY time-division multiplexing of Raman pump wavelengths into the optical system.

2. The method according to claim 1 wherein said Raman pump wavelengths comprise a finite set of discrete wavelengths.

3. The method according to claim 1 wherein the plurality of Raman pumps produce pump signals of varying wavelengths.

4. The method according to claim 1 wherein said Raman pump wavelengths traverse the optical system in a same direction as an optical signal traversing the optical system.

5. The method according to claim 1 wherein said Raman pump wavelengths traverse the optical system in a counter-propagating direction an optical signal traversing the optical system.

6. The method according to claim 1 wherein selected Raman pump wavelengths comprise a finite set of discrete wavelengths and other selected pump wavelengths are varying.

7. In an optical system comprising:

an optical path;

a plurality of couplers in optical communication with the path;

a plurality of Raman pumps, optically connected to the optical couplers;

a method of pumping the optical system CHARACTERIZED IN THAT: Raman pump wavelengths output by the Raman pumps are time division multiplexed into the optical system.

8. The method according to claim 7 wherein said Raman pump wavelengths comprise a finite set of discrete wavelengths.

9. The method according to claim 7 wherein said Raman pump wavelengths are varying.

10. The method according to claim 7 wherein the Raman pump wavelengths are coupled into the optical system such that they traverse the optical system in a same direction as optical signals traversing the optical path.

11. The method according to claim 7 wherein the Raman pump wavelengths are coupled into the optical system such that they traverse the optical system in a counter-propagating direction as optical signals traversing the optical path.

12. The method according to claim 7 wherein selected ones of Raman pump wavelengths comprise a finite set of discrete wavelengths and other selected pump wavelengths are varying.

13. An optical system comprising:

an optical path;

means for generating a plurality optical Raman pump signals;

means for coupling the plurality of optical Raman pump signals into the optical path;

CHARACTERIZED IN THAT:

the plurality of optical Raman pump signals are time-division multiplexed.

14. The system of claim 13 wherein the optical Raman pump signals comprise a finite set of discrete wavelengths.

15. The system of claim 13 wherein the optical Raman pump signals comprise a set of varying wavelengths.

16. The system of claim 13 wherein the optical Raman pump signals are coupled into the optical path in a direction that is the same as an optical signal traversing the optical path.

17. The system of claim 13 wherein the optical Raman pump signals are coupled into the optical path in a direction that is counter to an optical signal traversing the optical path.

18. The system of claim 13 wherein selected ones of the Raman pump wavelengths comprise a finite set of discrete wavelengths and other selected pump wavelengths are varying.

19. A method of pumping an optical system from a plurality of Raman pumps such that Raman pump signals generated from the Raman pumps are time division multiplexed.

20. The method according to claim 19 wherein the Raman pump signals are counter-propagating signals.

21. A method of generating a Raman gain band in an optical system having a plurality of optical Raman pumps, the method CHARACTERIZED BY:

time division multiplexing optical Raman signals produced by the Raman pumps into the optical system.

22. The method according to claim 21 wherein the Raman pump signals are counter-propagating signals.

23. The method according to claim 22 wherein the Raman pump signals are wavelength varying signals produced by a plurality of lasers and the wavelength varying characteristic is combined with synchronized control of the laser's output power.

24. A method of pumping an optical system including at least one Raman pump CHARACTERIZED BY time-division multiplexing of the wavelengths of said at least one Raman pump into the optical system.

25. The method according to claim 24 wherein the wavelengths of said at least one Raman pump comprise a finite set of discrete wavelengths.

26. The method according to claim 24 wherein said at least one Raman pump produces pump signals of varying wavelengths.

27. The method according to claim 24 wherein the wavelengths of said at least one Raman pump traverse the optical system in a counter-propagating direction as an optical signal traversing the optical system.

28. The method according to claim 24 wherein the wavelengths of said at least one Raman pump traverse the optical system in a same direction as an optical signal traversing the optical system.

29. The method according to claim 24 wherein the wavelengths of said at least one Raman pump have a continuous pump laser sweep pattern.

* * * * *